United States Patent [19]
Helms et al.

[11] 4,454,601
[45] Jun. 12, 1984

[54] METHOD AND APPARATUS FOR COMMUNICATION OF INFORMATION AND ERROR CHECKING

[75] Inventors: Walter J. Helms; James R. Geisler, both of Cincinnati, Ohio

[73] Assignee: General Signal Corporation, Stamford, Conn.

[21] Appl. No.: 348,524

[22] Filed: Feb. 11, 1982

[51] Int. Cl.$^3$ .................... H04L 1/14; G06F 11/08
[52] U.S. Cl. .................................................. 371/34
[58] Field of Search ............ 371/34; 370/85, 94; 340/825.03, 825.52

[56] References Cited

U.S. PATENT DOCUMENTS

| | | | |
|---|---|---|---|
| 3,252,138 | 5/1966 | Young | 371/34 |
| 3,995,258 | 11/1976 | Barlow | 371/34 |
| 4,250,489 | 2/1981 | Dudash et al. | 340/825.52 |
| 4,254,499 | 3/1981 | Yoshikane | 370/85 |

Primary Examiner—Charles E. Atkinson
Attorney, Agent, or Firm—Pollock, Vande Sande & Priddy

[57] ABSTRACT

Information originating at a plurality of terminal units is transmitted to a common information sink via a concentrator coupled between a plurality of terminal units and the common information sink. In one embodiment, used in a time reporting system, the information originates at a token reader at each of the terminals which is arranged to read pre-recorded information on an identification badge or time card. Each terminal is connected to the concentrator over a dedicated duplex communication link, and when the terminal has information to transmit, a first word is transmitted to the concentrator, the concentrator, in addition to being coupled to each of the terminals, is coupled to the information sink via a dedicated duplex communication link. Assuming the concentrator is idle, when a first word is received at a concentrator from a terminal, the concentrator attempts to seize the link between it and the common information sink. If successful, it transmits an address word corresponding to the address of the terminal from which it received the transmitted word. The information sink, upon receipt of an address, echoes the same to the concentrator. The echoed address is checked at the concentrator and on a favorable result, the concentrator transmits the word received from the terminal to the sink. Upon receipt of the word at the sink, the sink echoes the word to the concentrator. The concentrator, then transmits a copy of the echoed word to the terminal. Assuming the word received back at the terminal is an echo of the word it transmitted, it transmits a second word. If the concentrator detects an error in the address echo, or if the terminal detects an error in the word echo, the erroneously received address or word is retransmitted. If the error is not corrected in one of several retries, the attempt at transmission is terminated. In the time reporting system, a real time clock periodically sends time information to both the information sink and each of the terminals, thus obviating the necessity for any of the terminals to include time information in the message transmitted to the sink.

14 Claims, 7 Drawing Figures

FIG.1

FIG. 2 TRANSMIT/RECEIVE MODULE

FIG. 3  CPU MODULE

METHOD AND APPARATUS FOR COMMUNICATION OF INFORMATION AND ERROR CHECKING

FIELD OF THE INVENTION

The present invention relates to efficient communication of information from a plurality of terminals to a common information sink.

BACKGROUND OF THE INVENTION

The art of transmitting information in an effective and reliable manner has been developed over a long period of time, and the introduction of electronic devices has resulted in increases in the rate at which information is transmitted as well as the reliability with which the information is transmitted.

To insure the reliability of the information transmitted, error detecting and correcting techniques have long been applied to the transmission of information. One conventional error detecting technique is to require the receiver of information to send a copy of the received information back to the transmitter. The transmitter can then compare the transmitted information with the received information, and assuming they are identical, assume that the receiver properly received the transmitted information. In the event that the transmitter notes a difference between the transmitted and received information, the transmitter is arranged to assume that the receiver improperly received the information, and the transmitter may retransmit the information.

Typically, in any information communication system, the transmitter and receiver are spaced apart and therefore must be coupled by some communication link or channel. In those applications in which the communication channel includes conductors, it has been apparent for some time that rather than employing dedicated conductors for each transmitter/receiver pair, it may be effective, if many transmitters are mostly idle, to add an additional unit for concentrating information derived from a plurality of transmitters so that the information is then transmitted from the concentrator on a single communication channel. This has proven to be an effective technique if the transmitters are usually idle and therefore, there is sufficient time between transmissions from one transmitter for transmitting information for others of the transmitters. The same concentration technique can be used when the communication channel is a frequency or time divided link.

Notwithstanding the foregoing conventional techniques, it has also been apparent for some time that the use of these techniques carriers with it certain disadvantages. When a concentrator is employed, the very presence of the concentrator requires apparatus in addition to that which would have otherwise been necessary had the concentrator not been added. Therefore, efforts have been made to simplify concentrators, and one of the objects of the present invention is to provide effective information transmission systems with a relatively simple concentrator and without loss of error detection and correction function.

The advent of the microprocessor, with its ability to perform varied functions, has meant that more and more intelligence can be distributed throughout an information communication system without paying a penalty of high costs. However, the simplification goal in such a system is not achieved by the mere presence of such a microprocessor. With the use of microprocessors, the penalty paid for undue complexity is now no longer hardware costs, but rather the cost of preparing suitable programs for each of the microprocessors in the system as well as the time taken by the processors in executing the instructions which might not have been necessary.

SUMMARY OF THE INVENTION

It is therefore one object of the present invention to provide an information communication system which is effective in that it includes error detecting and correcting techniques, but at the same time, relatively simple in that error detecting and correcting is only carried out by a functional unit on information which has originated at the unit. For example, in a time information reporting system, each of the transmitters (sometimes called terminals) includes a token reader for reading prerecorded information from an identification badge or time card. This information is transmitted to a common information sink, for example, a digital computer, where, with this information, payroll calculations can be effected. This is more effective than employing time cards for preparing payroll information in that, with the communication function, time cards themselves can be eliminated and each employee may carry only an identification card or badge carrying pre-recorded information as to his identity. Even in those cases which, for other reasons, require the retention of the time card, automatically communicating information corresponding to time of arrival and time of departure eliminates possible errors in manual transcription from the time card and prevents loss of information if the time card itself is misplaced. In a typical operation, an employee inserts the time card or ID badge into the token reader, and the information read from the token is temporarily stored.

The terminal then transmits to a connected concentrator, but it only transmits one character of a message, corresponding to one digital word, at a time. At the concentrator, when a word is received, it is transmitted to the information sink. Since the concentrator and sink are coupled by a duplex communication link which is operated in half duplex fashion, the concentrator must first seize the channel. It does this with a line request. When the channel is siezed, the concentrator then sends an address word corresponding to the transmitting terminal. When the concentrator is assured that the address word has been properly received, the word transmitted by the terminal is forwarded to the sink. The error detection technique requires the sink to echo the received word to the concentrator. Rather than attempting to check for errors at the concentrator, the echo from the sink is transmitted back to the terminal where it is compared with the transmitted word. If they agree, the terminal will send an additional word. When the concentrator receives this word, it need not seize the line since it has already accomplished that function. It merely transmits the address of the transmitting terminal and, if properly echoed, the terminal transmitted word.

It should be apparent that the protocol is self-pacing since a word is only transmitted after error checking is completed, minimizing concentrator equipment, and simplifying the concentrator function since it performs no error checking on terminal originated words. Furthermore, the concentrator does not function to resolve contention among terminals. The concentrator includes a USART for each terminal, and the USART buffers are scanned until a waiting word is detected. On determining which USART has a word, the concentrator, assuming it has seized the channel to the sink, merely transmits the corresponding address and, when properly echoed, the word itself. On receipt of the word echo, it is transmitted back to the terminal. In this fashion, each word of the message may be transmitted. Message words from various terminals may be interleaved since each word is preceded by the address of its source. If the terminal detects an error in the word echo, it transmits a word indicating the error. The concentrator treats this error indication as it would any other word and sends it on to the sink where it is used to delete the erroneous word. When the error is properly echoed, the terminal will retransmit the correct word. This entire operation is transparent to the concentrator and thus does not introduce any complexity into the concentrator.

Thus, in accordance with the invention the communication system includes a plurality of terminals, a concentrator, plural duplex communication links each connected between a different terminal and the concentrator, a common information sink and a further duplex communication link connecting concentrator and sink, each of the terminals including transmitter/receiving means coupled to one of said plural duplex communication links for transmitting, when stimulated, in the form of plural multi-bit words and, at other times, receiving a multi-bit word, control means to stimulate said transmitting means to transmit a single word and then to transmit a single additional word, upon receipt at said terminal, of an echo of said single transmitted word, until all words are transmitted, said connector including a first transmitting/receiving means for each said terminal and connected to one associated duplex communication link within said plural links, and a second transmitting/receiving means for said sink and connected to said further duplex communication link, and control means for selectively coupling information from said first transmitting/receiving means to said second transmitting/receiving means and for selectively coupling information from said second transmitting/receiving means to a one of first transmitting/receiving means, said common information sink including transmitting/receiving means coupled to said further duplex communication link and control means responsive to receipt of information from said transmitting/receiving means to stimulate said transmitting/receiving means to transmit an echo of said information on said further duplex communication link.

A communication protocol for transferring information from a plurality of terminals, through a concentrator, to an information sink, comprises the steps of:

(a) transmitting, from a terminal unit, a first information unit of a multi-unit record at any time such record is available, (b) upon receipt, at said concentrator of an apparent information unit, transmitting to said sink a request to achieve sender status but only if both concentrator and sink are idle, queuing said request if said concentrator is in receiver status and skipping this step if said concentrator is in sender status, (c) upon receipt, at said sink of a request to achieve sender status, transmitting an acknowledgement to said concentrator, (d) upon receipt, at said concentrator of an acknowledgement from said sink signifying sender status, transmitting an address corresponding to said terminal unit, (e) upon receipt, at said sink of an apparent address following transmission of an acknowledgement by said sink, transmitting a copy of said apparent address, (f) upon proper receipt, at said concentrator of said copy of said address, transmitting said apparent information unit, (g) upon receipt, at said sink of said apparent information unit, transmitting a copy of said apparent information unit, (h) upon receipt, at said concentrator of said copy of said apparent information unit, transmitting to said terminal a copy of said copy of said apparent information unit, (i) upon receipt at said terminal unit of an echo of said first information unit, transmitting a subsequent information unit.

BRIEF DESCRIPTION OF THE DRAWINGS

The invention will now be explained, in the following portion of the specification when taken in conjunction with the attached drawings in which like reference characters identify identical apparatus, and in which.

DETAILED DESCRIPTION OF PREFERRED EMBODIMENTS

The present invention will now be disclosed in connection with a time reporting system. The time reporting system is employed to transmit messages corresponding to information read by a token reader at a terminal, to a common information sink. The token can comprise a physical object (such as an ID badge) which has encoded thereon, on one conventional form or another, information corresponding to multiple alphanumeric characters or the like. Rather than comprising an ID badge, the token can also comprise a time card which includes the same information as well as including human-readable information which may be permanently imprinted on the card or imprinted on the card by the terminal itself. For example, a time card might include, in one area, a machine-readable identification code, and further include a matrix of "time in" and "time out" locations, for example, one for each day of the week, in which the terminal can, in sequence, print visible (human-readable, in contrast to machine-readable) characters, corresponding to the sequential times during which the time card is presented to the terminal. In this context, the information reporting system of the invention is employed to transfer the information read from the token to the common information sink.

At the information sink the token read information can identify an employee. Successive receipt of employee identification can be interpreted as a punch-in and punch-out, the time of the event is available to the sink from another source.

Figure 1:
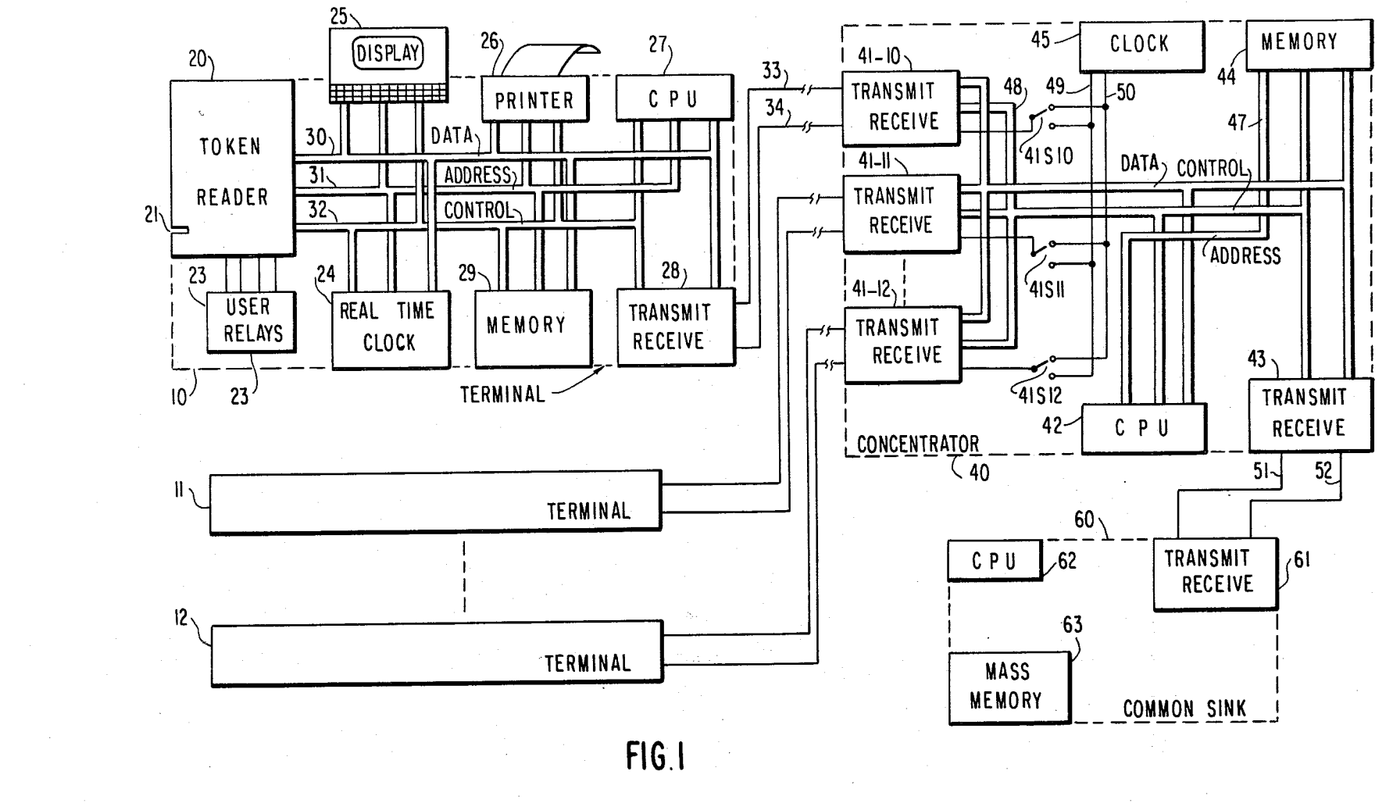
FIG. 1 is a block diagram of the inventive communication system.

FIG. 1 comprises a detailed block diagram of typical components forming the information communication system; in FIG. 1, a plurality of terminals 10 through 12 are illustrated. As is implied in FIG. 1, the number of terminals can be increased above the three which are illustrated. The components of terminal 10 are shown in FIG. 1, and the other terminals in the system may include similar components, or at least some of the components as shown in FIG. 1 and in addition, could include other components not illustrated in FIG. 1.

Terminal 10 includes a token reader 20 which can read a token when inserted into the mouth 21 of the token reader. Reading, for purposes of this application, encompasses sensing information encoded in some form on the token and converting that information into electrical manifestations of that information. Also included in the terminal 10 are additional input and/or output units including a display/keyboard 25 and a line printer 26. The display 25 is arranged to display selected information using one of a plurality of conventional technologies, such as, for example, cathode ray tube, LEDs, plasma displays and the like. The keyboard 25 may, using conventional techniques, input information to the terminal 10. The keyboard can vary in scope from a set of a few switches, a full numerical keypad, a conventional typewriter keyboard or any combination of the foregoing. Also included in the terminal 10, although not immediately accessible outside the terminal, is a CPU module 27 which may comprise a conventional microprocessor and associated logic circuitry, a transmit receive module 28, which can comprise a conventional USART and associated circuitry, a bulk memory device 29 which, in preferred embodiments, in solid state RAM, a real time clock module 24 for providing time of day indications to both printer 26 and display 25 in a conventional fashion, and a user relay module 23 which may include one or more electro-mechanical or solid state relays arranged for field configuration to perform one of a plurality of selectable functions. Interconnecting the various components to the terminal are a plurality of buses including a data bus 30 and address bus 31 and a control bus 32. The illustration in FIG. 1 depicts each bus as comprising multiple conductors.

Interconnecting each terminal and the concentrator 40 is a pair of communication channels, so that each terminal is coupled to the concentrator over a duplex communication link. Thus, as shown in FIG. 1, the terminal 10 is coupled to concentrator 40 over a transmit channel 33 and a receive channel 34. While in a preferred embodiment of the invention, each of the channels is an individual conductor pair, it is within the scope of the invention to use any other conventional communication channel technology, i.e., wired carrier, radio wave, or the like.

As shown in FIG. 1, the concentrator 40 includes a transmit/receive module 41 for each of the connected terminals, and thus, for terminals 10-12, concentrator 40 includes transmit/receive modules 41-10 through 41-12. The concentrator also includes a CPU module 42 which can comprise a conventional microprocessor with associated ROM and other logic circuitry, a further transmit/receive module 43, a memory module 44 arranged for reading and writing, and which, in a preferred embodiment, comprises solid state RAM. The concentrator 40 also includes a clock 45. Various of the components of the concentrator 40 are interconnected by data, address and control buses 46-48. In addition, the clock module 45 distributes plural timing signals over conductors 49 and 50 to the transmit/receive modules 41. These clocking signals are selectively coupled into the transmit/receive modules by associated switches 41S10, 41S11 and 41S12, respectively. In this fashion, the basic clocking rate of each of the transmit/receive modules 41 is selectable. While the switches 41S are illustrated as mechanical switches, those of ordinary skill in the art will understand that other electro-mechanical or electronic switches can be substituted. The concentrator 40 is coupled to the common sink 60 via dedicated transmit and receive channels 51 and 52, respectively. While in a preferred embodiment of the invention, each of the transmit/receive channels 51 and 52 comprise a separate conductor pair, it is within the scope of the invention to employ any other conventional communication channel technology. It is the function of the concentrator to transmit terminal transmitted information to the sink and to assist in the error detecting and correcting function.

Finally, the common information sink 60 includes a transmit/receive module 61 which is coupled to the transmit and receive channels 51 and 52. In addition, the common information sink includes a CPU 62 and associated mass memory 63. The common information sink 60 is capable of transmitting and receiving information in a format acceptable to the concentrator 40 over the transmit/receive channels 51 and 52, operating in the protocol of the invention, and storing and processing information so received over the communication channels. Beyond this, the particular form of the common information sink 60 plays no part in the invention. It is a goal of the invention to communicate information from each of the terminals to the sink 60, and to insure that that information has been properly received. To this end, preferred forms of the sink include, in the transmit/receive module 61, a USART similar to transmit/receive modules 41 of the concentrator and the terminals, each of which will be described in detail hereinafter. Although not illustrated in FIG. 1, it is within the scope of the invention to employ multiple copies of the concentrator 40, each with its associated connected terminals, and to this end, the common information sink 60 may include additional transmit/receive modules such as the transmit/receive module 61, with each different concentrator 40 coupled to a different transmit/receive module 61.

Typically, the sink 60 can also act as a transmitter to transmit selectively to a particular terminal via the concentrator 40 using a similar error control protocol as the one which will now be described for use in the transmission of information to the sink 60.

GENERAL DESCRIPTION OF OPERATION

In brief compass, information accepted by a token reader 20 at any one of the terminals is stored in reserved areas in the memory 29 under direction of the CPU module 27. When a complete record, including all the information read from the single token is stored, the CPU 27 stimulates the transmit/receive module 28 to transmit a first portion of that record, comprising a first character represented as a multi-bit word. That message is received by the associated transmit/receive module 41 and such reception is indicated to the CPU module 42.

Assuming the concentrator is in the idle status, it attempts to achieve sender status, to enable it to transmit information, this is effected by transmitting a request (ENQ character) to the common sink 60 over the transmit channel 51. If the concentrator receives the appropriate reply (ACK character) it will then transmit the address of the terminal from which the character was received. Since each terminal is coupled to a different transmit/receive module 41, the identity of the transmit/receive module 41 can be used to determine the address to be transmitted. When the concentrator 40 has transmitted the address, it awaits receipt of an address echo from the sink 60. When the echo is received at the transmit/receive module 43, it is coupled to the CPU module 42 where it is compared with the transmitted address. If the addresses compare, then, under the control of the CPU 42, the received character is withdrawn from the USART buffer and transmitted over the transmit channel 51 to the common sink 60. Following transmission of that character, the concentrator awaits an echo, and when an echo is received, it is directed, under control of the CPU 42, to the transmit/receive module 41 associated with the terminal from which the character was received. Thus, some time after the terminal has transmitted a character, it receives an echo of the character from the associated transmit/receive module 41. This echo is, under control of the CPU module 27, compared with the transmitted character. Assuming the transmitted character and echo compare, under control of the CPU module 27, a second character in the record is transmitted. The concentrator 40 responds to receipt of the second character in exactly the same fashion as it responds to receipt of the first character except that it will normally be in sender status when the second and subsequent characters are received and therefore, there is no necessity for the concentrator 40 to request sender status. When the terminal has received an appropriate echo for the last character in the record, it simply ceases further transmission.

The process carried out at the sink 60 is relatively simple; once communication is established (in a manner to be explained hereinafter), it simply echoes received characters. When communication is terminated (in a manner to be described), it can assume each received character has been properly received and begin to process the received information.

The sink 60 can also transmit to any selected terminal, or to all terminals. To effect transmission in this direction, the sink 60 first establishes communication with the concentrator 40 (in a manner to be described). An address is transmitted to the concentrator, which echoes the address. The sink 60 then transmits the first word of the message. On receipt of the word at the concentrator, it is passed on to the appropriate terminal. The addressed terminal then echoes the word. The concentrator passes the echo on to the sink. When the sink receives an echo, it may send another word, representing a further information unit of the message or an error control character, if the echo indicates an error; or terminates the transmission (in a manner to be explained).

Figure 2:
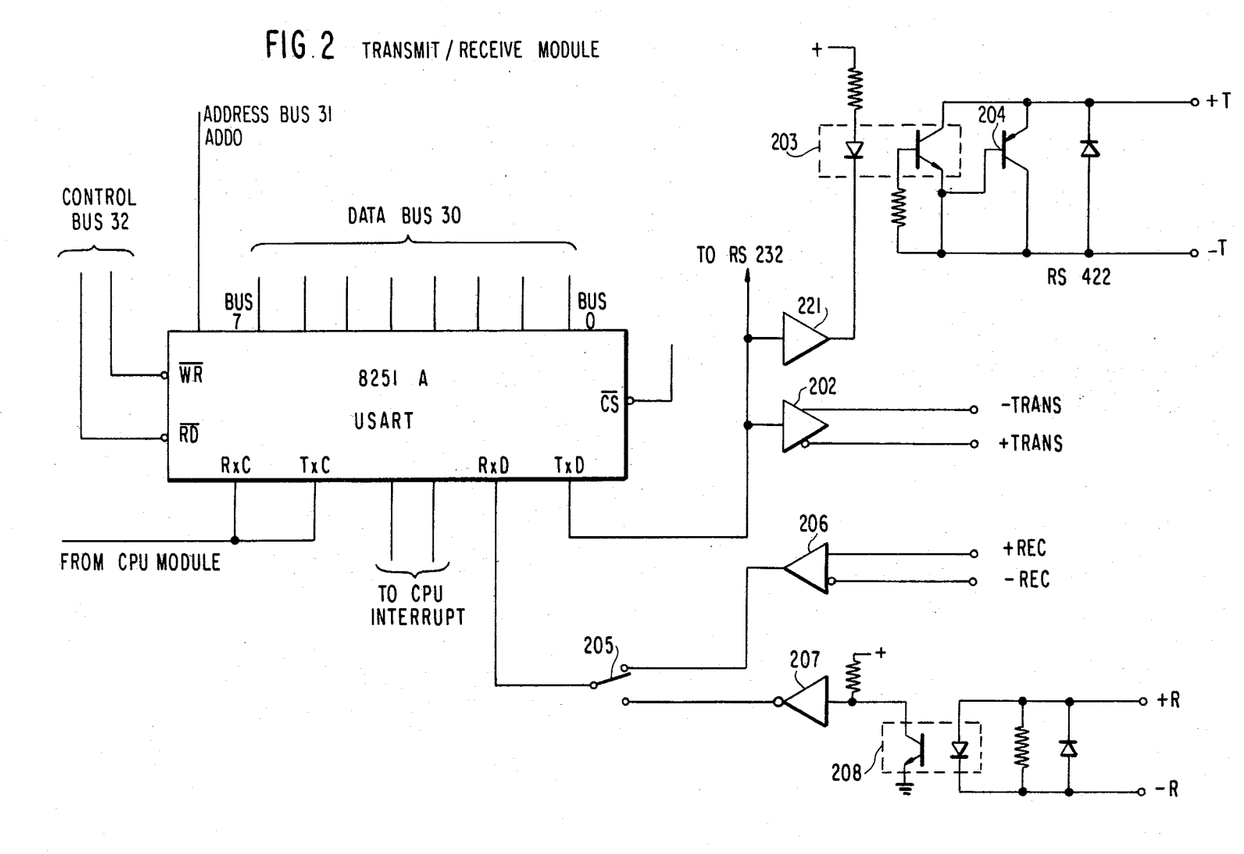
FIG. 2 is a block diagram of the TRANSMIT/RECEIVE module of FIG. 1.

FIG. 2 is a detailed block diagram of the transmit/receive module 28. As illustrated, the module comprises mainly a USART which may receive or place data on the data bus 30, and is also coupled to the address and control buses 31,32, respectively. Thus, for example, for transmission purposes, the USART will read data from the data bus 30, and conversely, for reception, the USART will write data into the data bus 30, under control of the $\overline{WR}$ or $\overline{RD}$ control signals from the control bus 32. The USART has an output $T \times D$ which is coupled to amplifers 201 and 202, respectively. Amplifier 201 has an output coupled to an optical coupler 203 and transistor 204 where the output is available at the terminals labelled $+T$ and $-T$ for coupling to an RS 422 channel. Amplifier 202 has a pair of bipolar outputs labelled $+TRANS$ and $-TRANS$ for use with a current loop channel. As indicated in FIG. 2 an RS232 channel could also be used. Depending on the type of communication channel used, the appropriate output is employed.

The USART has an input terminal $R \times D$ which is coupled to one pole of a single pole double throw switch 205. The two poles of the switch 205 are coupled, respectively, to the outputs of amplifiers 206 and 207. Inputs to the amplifier 206 are provided from the terminals labelled $+REC$ and $-REC$. The input to amplifier 207 is provided by an optical coupler 208 which has an input, in turn, from terminals labelled $+R$ and $-R$. Depending upon the type of communication channel which is available, either one or the other of the pair of terminals are connected to the channel, and the switch 205 is appropriately manipulated.

The clocking input to the USART, $R \times C$ and $T \times C$ is provided from the CPU module as will be explained hereinafter.

From the foregoing, the operation of the transmit/receive module should be apparent.

Figure 3:
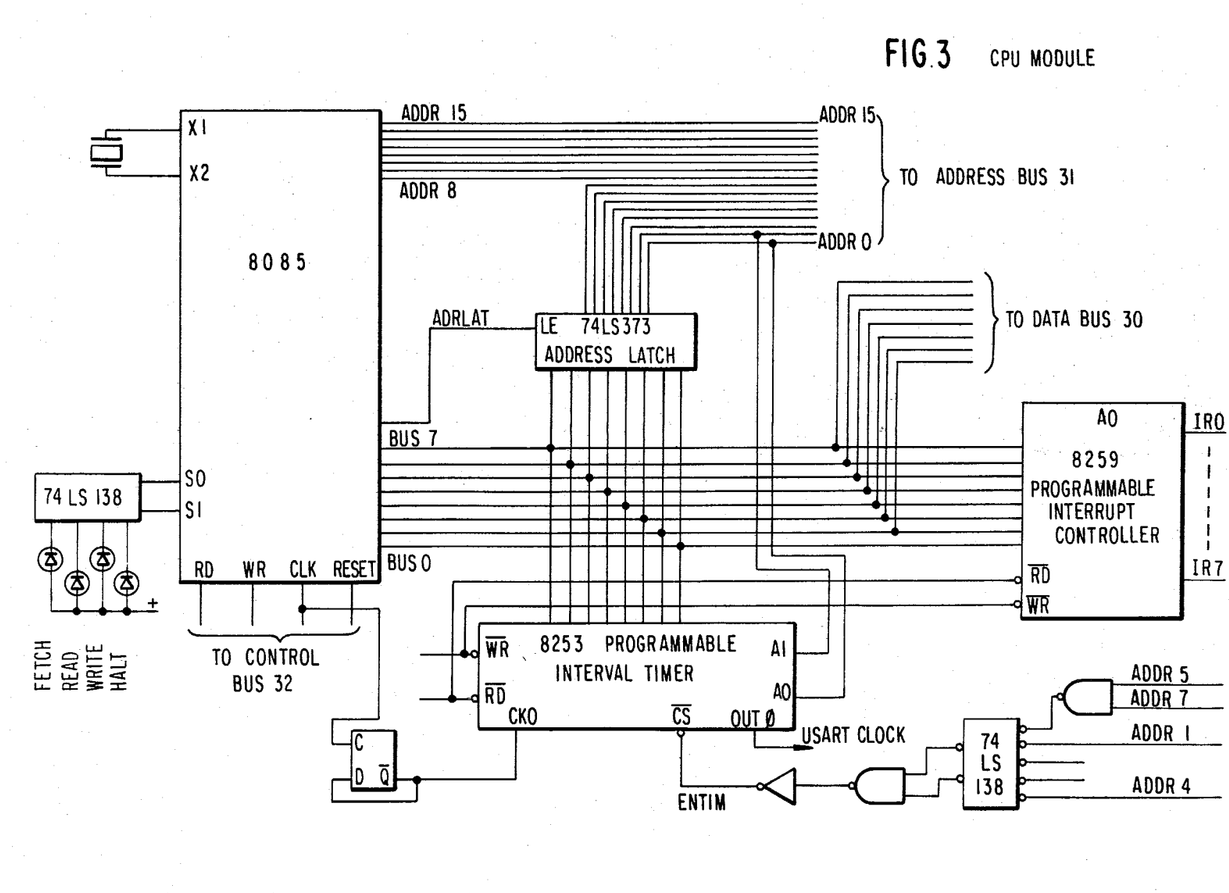
FIG. 3 is a block diagram of the CPU module of FIG. 1.

FIG. 3 is a detailed block diagram of the CPU module 27. As illustrated in FIG. 3, the CPU module includes a microprocessor such as, for example, the 8085 illustrated in FIG. 3.

The CPU is personalized by a ROM which contains its program. The CPU is responsive to a number of inputs and directs the provision of a number of outputs. Particularly, relevant to the invention, the CPU can respond to a token reader output by transferring the information to the transmit/receive module 28. More particularly, the token reader 20 provides a multi-character message, each character is represented by a multi-bit word. Each word is presented to the transmit/receive module 28 where it is transmitted serially by bit. The manner in which this transfer of information, from token reader 20 to transmit/receive module, is effected electrically is conventional. The manner in which it is logically controlled is described in the flow diagram of FIGS. 4A and 4B.

Figure 4A:
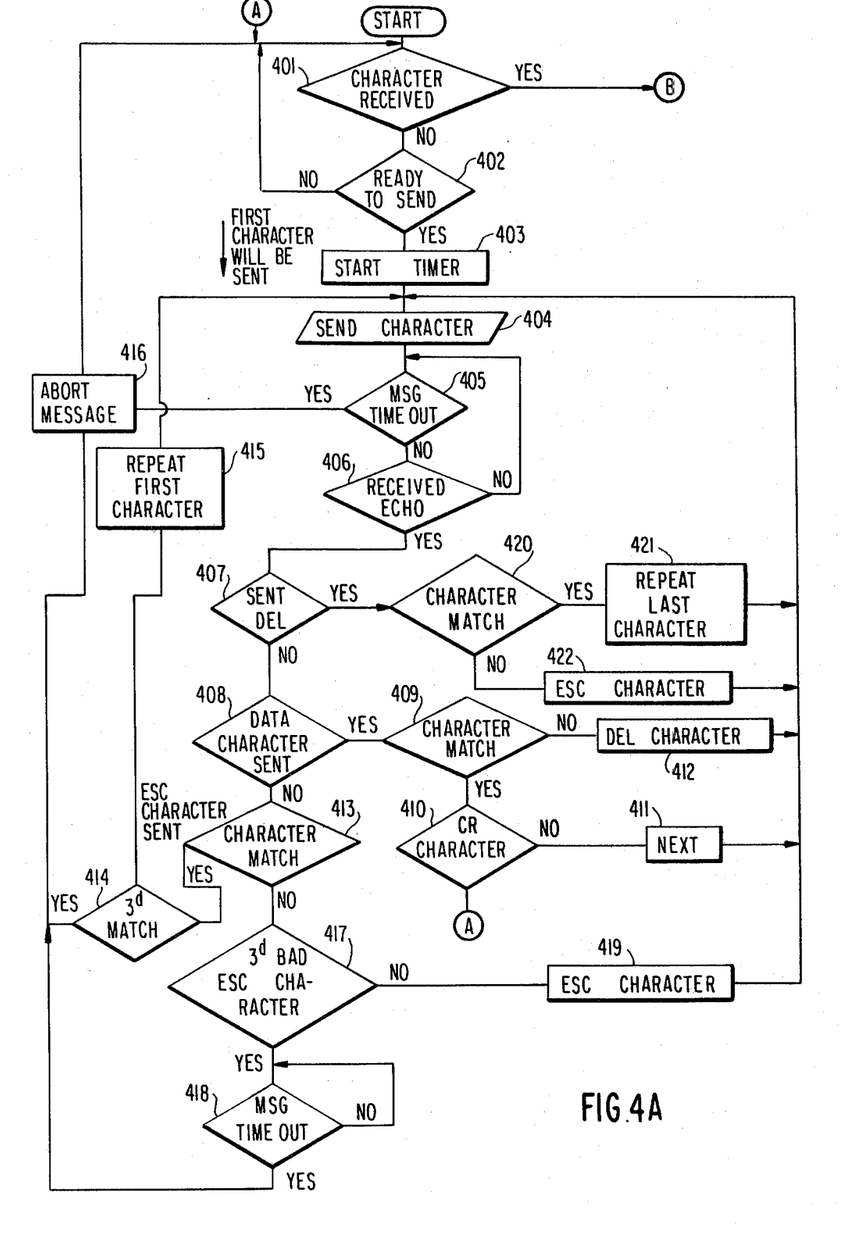
FIGS. 4A and 4B are a flow diagram illustrating the TRANSMIT/RECEIVE functions carried by the CPU module of FIG. 3, and FIGS. 5A–5B are a flow diagram of the functions carried out at concentrator CPU 42.

The microprocessor is initiated into operation by either the USART, on reception of a word, or by the token reader, when a meassage has been assembled for transmission. In either event, the first function performed by the microprocessor is to identify whether it must perform a reception or transmission function. Therefore, the first function 401 is to determine whether or not a word has been received. Assuming it has not, function 402 determines whether or not it is ready to send, i.e., whether an assembled message is available for transmission. Assuming it is, function 402 starts a message timer (i.e., the programmable interval timer 8253) and function 404 transmits the first character, i.e., signals indicative of the character are placed on the data bus, and the control bus is controlled so that the USART will be caused to transmit the character identified by the signals on the data bus. This transmission is serial by bit as is conventional. As is also conventional the USART may add start, stop and parity bits. Function 405 checks the message timer to see if it has timed out. If it has not, function 406 determines whether or not an echo has been received by the USART. Reception of a message is indicated by an interrupt from USART to CPU. Assuming an echo is not yet received, function 405 is performed again, and this pair of functions (405,406) are performed until either a time out occurs or an echo is received. Assuming an echo is received, function 407 determines if the character sent was the DEL character. The CPU maintains a copy of the last character sent, for this purpose. If it was not, function 408 determines whether a data character was sent. If a data character was sent, then function 409 determines if the echo and the transmitted character match. If they do, function 410 determines whether the character sent was a carriage return. If it was not, function 411 fetches the next character for transmission purposes and the functions beginning at function 404 are performed again for the transmission of the next character.

If, at function 409 it was determined that the echo did not match the transmitted character, then function 412 selects a delete (DEL) character which is then transmitted at function 404. Following that transmission, the preceding functions are again performed.

If, at function 408, it was determined that a data character was not sent, then the character that was sent had been an ESC character, then function 413 checks to see if the echo matched the character. Briefly, the protocol sends a DEL character if the echo is incorrect. If the DEL itself is improperly echoed an ESC character is sent. Receipt of a DEL character at the sink deletes the last received character. Receipt of an ESC character deletes the entire message. If the echo matches the ESC character, function 414 determines if this is the third match. If it is not, the microprocessor returns to the first character, at function 415 and again attempts to send the message. On the other hand, if this was the third match of the ESC character, then the message must be aborted, which is accomplished at function 416.

If, at function 413, the echo did not match the transmitted character, then function 417 determines if this is the third bad ESC character. If it is, then the message must be aborted. To effect this, function 418 is performed to determine if the timer had timed out. If it has not, the function is repeatedly performed until it does.

On the other hand, if at function 417, this was not the third bad ESC character, then function 419 formats a further ESC character for transmission and function 404 serves to transmit that character.

On the other hand, if a function 407 it was determined that the DEL character had been sent, then function 420 determines if the echo matched the transmitted character. If it did, then a successful delete has been performed and function 421 selects the last transmitted data character for repeat transmission. If, at function 420, it was determined that the echo did not match the transmitted DEL character, then function 422 selects the ESC character for transmission.

If, at function 401, it was determined that a character had been received, then function 423 (FIG. 4B) starts the message timer. Function 424 determines if a message timeout has occurred. Assuming it has not, function 424 determines if a character has been received. If it has not, functions 424 and 425 are performed until either a message time out occurs or a character is received. When a character is detected as having been received, functions 426 through 429 check for parity, framing an overrun errors. These are actually hardware checks that are peformed in the USART, and these functions in the microprocessor merely require detection of a specific control signal pattern. Assuming that no such errors are determined, function 429 determines if the received character is an ESC character. If it is, then function 436 echoes the ESC character and function 430 clears any prior portion of the received message. On the other hand, if the received character was not an ESC character, then function 430 determines if the character received was a DEL character. If it was, then function 431 clears the last character stored. On the other hand, if the character received was not a DEL character, then it must have been a data character, and function 432 stores that character. If any of functions 426 through 428 detected an error, then function 433 formats an NUL character, and when function 432 is performed, the data stored is an NUL character. Function 434 formats and transmits an echo. The echo will be that of the data character if such was received, the DEL character if that was received, of if a parity, framing or overrun error is detected, then function 434 echoes of the NUL character which is stored. Following the echo, function 435 determines if the character received was the CR character, signifying an end of message. If it was not, then the flow begins again at function 424 searching for either a time out or a further character. If the received character was the CR character then the process terminates.

Figure 4B:
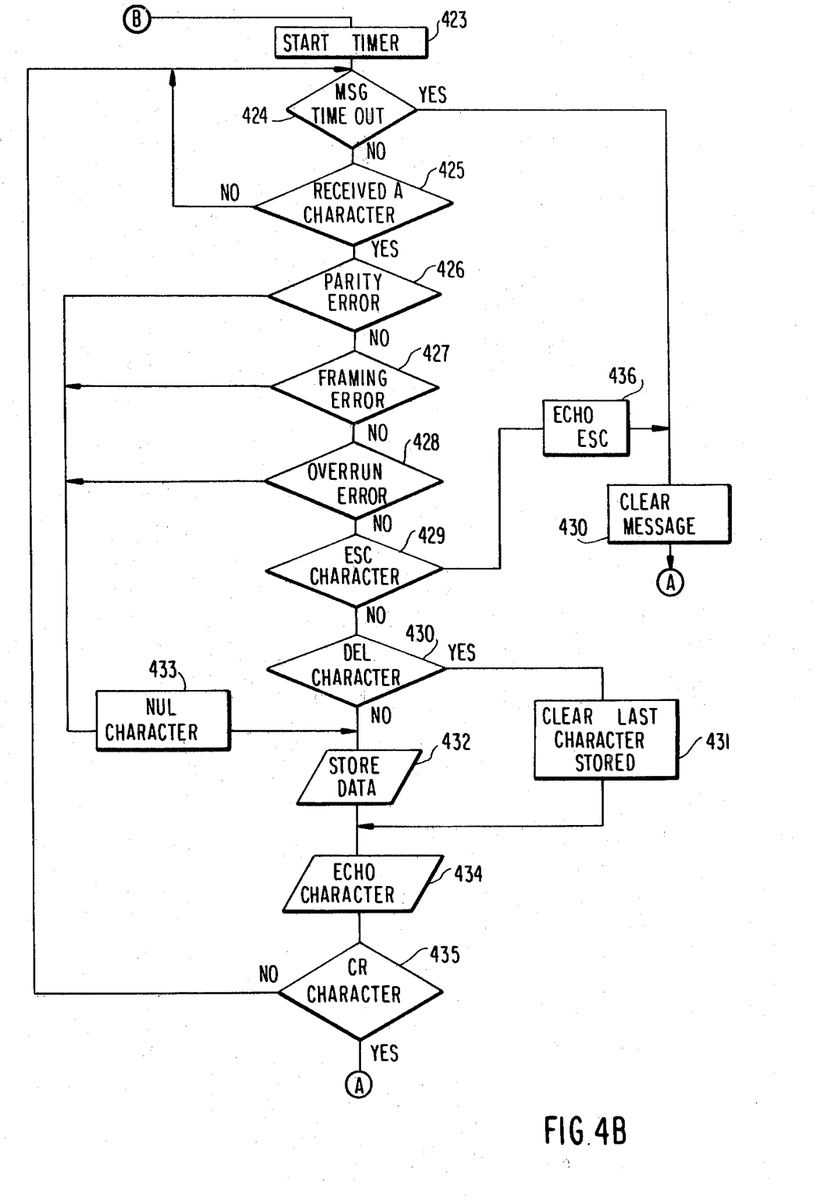

Thus, an overview of FIGS. 4A and 4B illustrates that the microprocessor performs both transmission and reception functions. Significantly, in respect of the transmission functions, after the transmission of a character, a further character is not sent unless the echo properly matches the transmitted character. If the echo does not match, then a delete (DEL) character is transmitted and after proper echo of the DEL the erroneously echoed character is repeated. If the echo failed to match a transmitted DEL character, then the ESC character is transmitted. When the ESC character is properly echoed, the entire message is repeated; if the ESC character was transmitted and improperly echoed, it will be repeated three times and if it is not properly echoed, the message will be aborted.

The reception function provides the counter part to the transmitter function in that, when a data, DEL, or ESC character is received, it is echoed, if a character is received with a hardware error, an NUL character is echoed to insure that at the transmitter an error will be detected. If the message timer expires, message transmission will be aborted at the transmitter which will cause the message timer at the receiver to expire to clear any portion of the message already received.

At the completion of a transmission of a message, by a terminal, or at abortion of transmission by reason of a time out, the CPU module 27 can determine whether the message was properly received at the sink 60. For example, if the terminal 10 has received an appropriate echo, from sink 60, for each character transmitted, then the message was properly received; otherwise, it cannot be assumed to have been properly received. The CPU module 27 may thereafter print the message to distinctively indicate receipt or nonreceipt by the sink 60, and clear the message from the terminal's memory. For example, the printer 26 can print messages in one of two colors to indicate whether or not the sink has acknowledged proper receipt by appropriate echoes.

While FIG. 4 has been discussed in connection with the terminal, exactly the same functions are performed at the information sink 60.

THE CONCENTRATOR

Before a detailed description of the concentrator hardware, and the functions performed by the concentrator microprocessor (the CPU module 42), a brief overview of the protocol between the concentrator and sink 60, and between concentrator and terminals is provided.

While the concentrator is connected to each terminal via a full duplex communication link, and each link terminates in a USART which is capable of full duplex operation, system software requires that communication be carried in half duplex. Fortunately, since each USART is only connected to the other, if it is not receiving, it is ready to transmit. Furthermore, because of the protocol requirements, the transmitter, once it transmits a character, will be ready to receive, since it expects to receive the echo character before transmission of the following character.

The protocol between the concentrator 40 and the sink 60 is, however, more complicated since the concentrator could be requested to transmit a character by one terminal when it is involved with communication with the sink 60 on behalf of another terminal, or when it is receiving a message from the sink 60. To resolve these potential problems before the concentrator will transmit a character it must first notify the sink 60 of the source of that character by transmitting an address corresponding to the terminal from which the character originated. However, even before transmitting an address, the concentrator 40 must insure that the sink 60 will be quiet to properly receive the transmitted address. To effect this, the concentrator, if idle, attempts to seize the communication channel by transmitting an ENQ character. The sink 60, in response to an ENQ character, must respond with an ACK character, indicating to the concentrator that it may proceed with the transmission. In the event of simultaneous transmission of ENQ characters by both sink 60 and concentrator 40, the concentrator 40 is enabled to respond to reception of an ENQ character with a further transmission of an ENQ character whereas sink 60 seeing an ENQ after its own ENQ transmission is constrained to send ACK. Thus if both sink 60 and concentrator 40 simultaneously or near simultaneously contend for the communication link, the concentrator 40 will prevail. Once a successful transmission of ENQ and receipt of ACK is achieved, the unit transmitting the ACK becomes a "receiver" and the unit receiving the ACK becomes the "sender". The status will not change at a receiver until it receives an EOT character from the "sender", signifying termination of the message. Likewise, the "sender" remains in that status until it receives an OK character in response to EOT transmission. Thus, for example, if the concentrator 40 seizes a line in response to a request from one terminal, it can maintain that status, after completion of one message, and immediately transmit a second message for another terminal. Throughout this time, the sink 60 must remain in "receiver" status.

In the event that a "sender" does not receive the OK character in response to its transmission of the EOT character, then it will again transmit an ENQ character. If the receiver had properly received the EOT character, it will have achieved idle status and will revert to receiver status on receipt of the following ENQ. If, on the other hand, the EOT was not properly received, then the receiver is still in that status and will issue the ACK in response to the ENQ. In either event, the receiver is firmly in receiver status and the transmitter can then attempt to terminate the message with a further EOT character.

Accordingly, both the concentrator 40 and sink 60 are normally in an idle state. In that state, they normally respond to the ENQ character and that response must either be ACK or another ENQ, but only by the concentrator 40 if it and sink 60 are both contending for "sender" status.

Before beginning transmission of the message, the sender transmits an address, if the sender is the concentrator, the address transmitted is that identifying the terminal from which the message originates, and in the case of the sink 60, the address indicates the identity of the terminal for which the message is destined. Just like any other character, the address must be fully echoed before a further character can be transmitted. Uniquely in the case of an address transmitted by the concentrator 40, however, the concentrator 40 handles echo verification. This is the only character whose echo is verified by the concentrator 40. In the event that a terminal or sink receives a character with a parity, overrun or framing error, rather than responding with the received character, it responds with a NUL character which is especially chosen so that the sender will not be able to properly match the transmitted character and echo. Any terminal receiving an echo which does not match the transmitted character is constrained to transmit a delete character (DEL). The sink or terminal receiving a DEL character deletes the last valid received character, and also echoes the DEL character. When a transmitted DEL character is properly echoed, the transmitter again transmits the character whose erroneous echo caused transmission of the DEL character. If the DEL character is improperly echoed, then the transmitter transmits a further control character, the escape (ESC) character. A terminal or sink receiving an ESC character is constrained to clear the entire message, and of course, echo the character. When an ESC character is properly echoed, the transmitter begins transmitting the message again. Improper echo of the ESC character causes the ESC character to be retransmitted. If the ESC character is improperly echoed three times in succession, then the message is aborted and the transmitter must await message time out before again attempting to transmit. All three units, i.e . . . , terminal, concentrator and sink, initiate a timer when a message is being transmitted or received. While the period of this background timer can be varied to suit different circumstances, in an embodiment of the invention which has been constructed the timer period at all those devices is about two seconds. If, during the process of message transmission or reception, the timer expires, then, at the transmitter, the message must be retransmitted, and at the receiver, the portion of the received message is cleared.

CONCENTRATOR HARDWARE

The concentrator 40 hardware is shown in block diagram form in FIG. 1. These transmit/modules 41 or 43 are similar to the detailed schematic of FIG. 2, except that the USART clock, rather than being derived from the CPU module 27 as is the case with the terminal, is derived from the associated one of switches 41S; however, those skilled in the art will understand that the USART 41 and the corresponding USART in module 28 must operate at identical baud rates. The CPU module 42 is similar to the detailed schematic of FIG. 3.

Figure 5A:
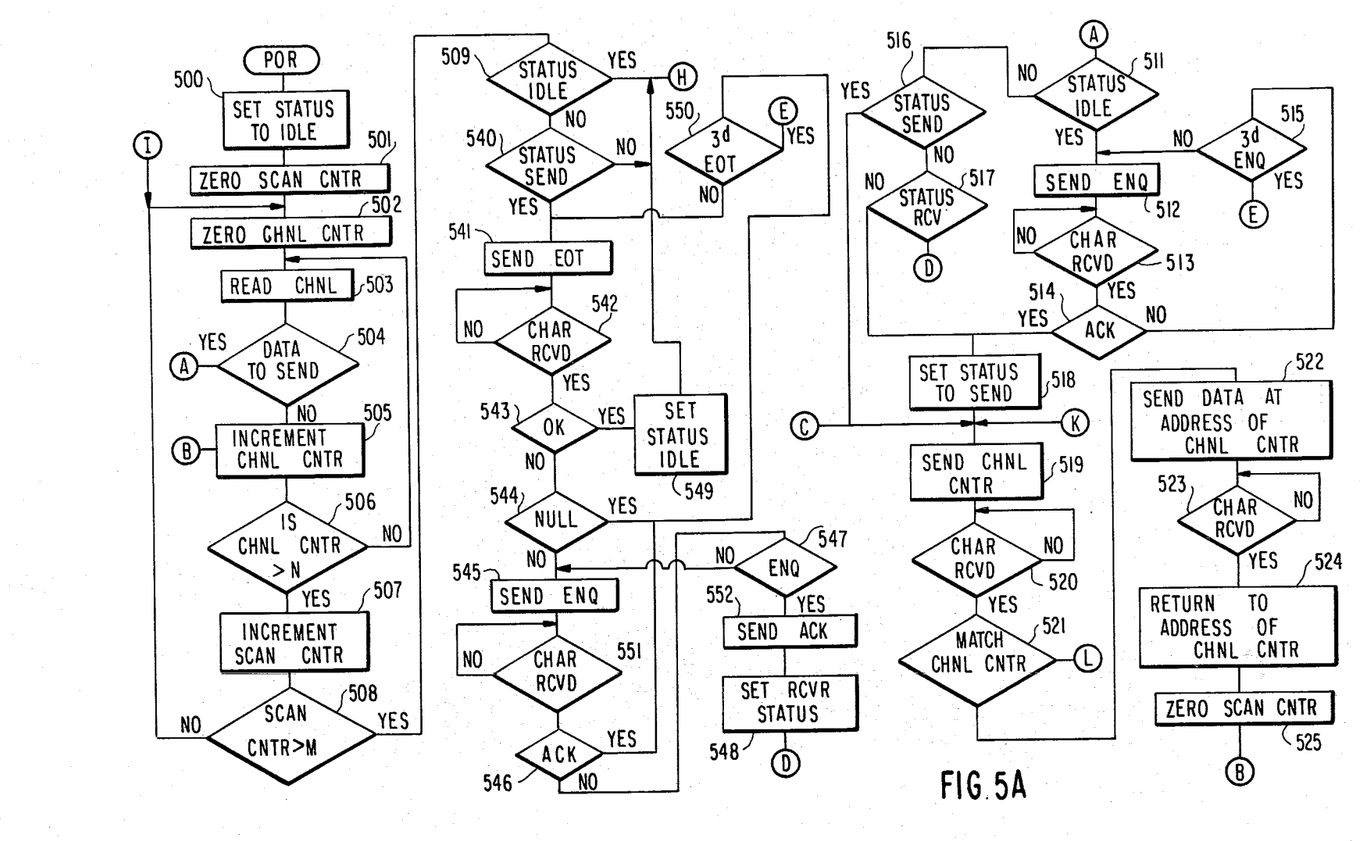
Figure 5B:
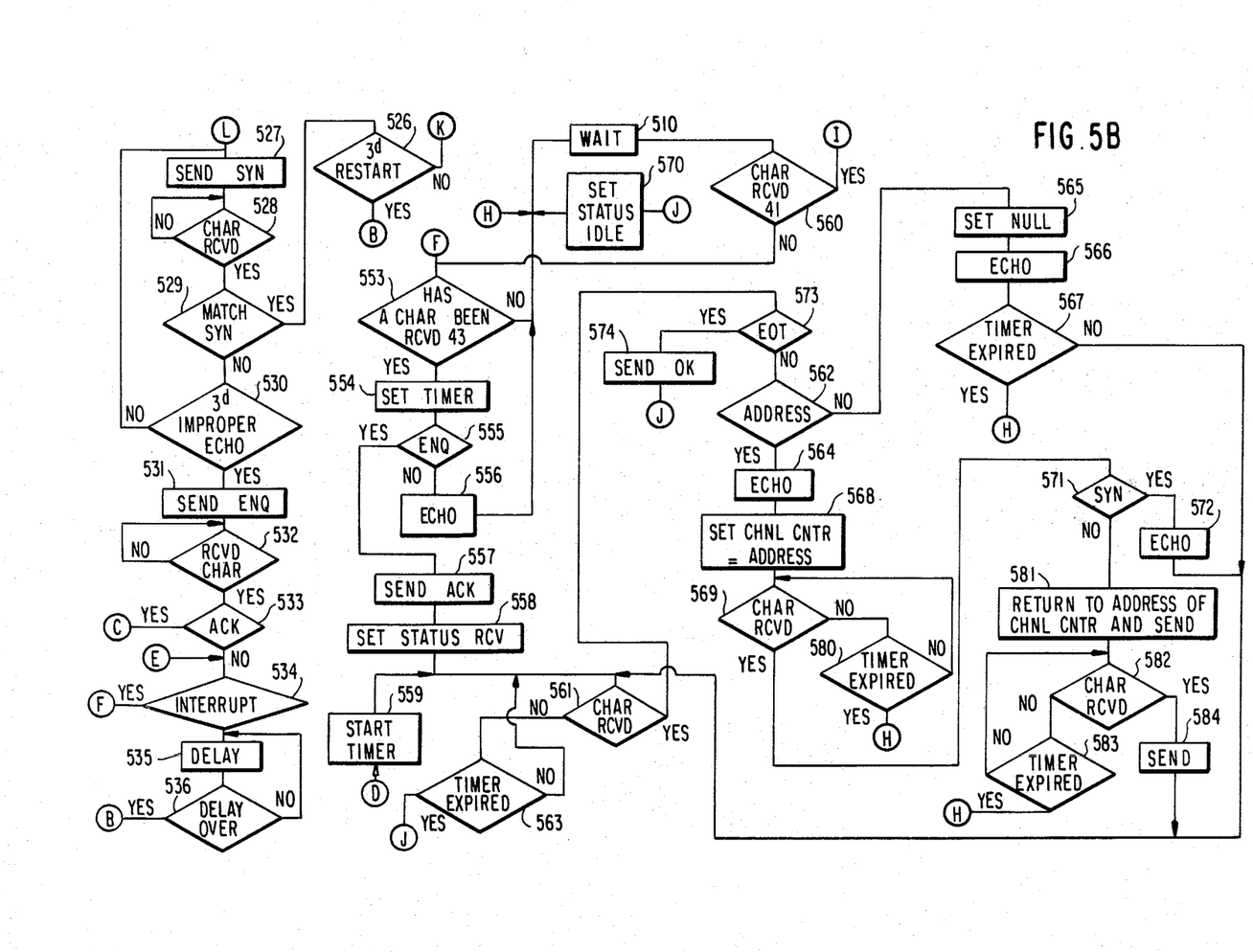

FIGS. 5A-5B illustrate, in flow diagram form the processing taking place at the CPU module 42.

Referring now to FIG. 5A, on power ON or RESET, function 500 sets the status to IDLE, function 501 zeros a scan counter, which is a software counter maintained in the module, and function 502 zeros a channel counter, another similar software counter. The channel counter maintains a number of distinct states equal to the number of different transmit/receive modules 41, so that each unique receive state of the channel counter corresponds to a different terminal, the manner in which the counter is maintained is described hereinafter.

Function 503 reads the channel addressed by the channel counter; this merely requires reference to the associated USART to determine if it has data to send; that is, whether it has received a character from its associated terminal. Function 504 determines if there is data to send, and if there is not function 505 increments the channel counter and function 506 compares the channel counter to a number N equal to the number of terminals associated with the concentrator 40. If the channel counter is not greater than the number N, then the loop of functions 503 to 506 is performed looking for either a USART with data to send until the channel counter exceeds the number N. When the channel counter exceeds this number, function 507 increments the scan counter and function 508 compares the scan counter contents to another number M. A reason for this function will be apparent as this description proceeds; at this point it suffices to note that once the concentrator has engaged in the act of transmitting characters from a terminal to the sink, and it is in the send status rather than idle status, it is advantageous to maintain this status for a time sufficient for an echo to travel to the terminal for verification so that the terminal can transmit an additional character. This is implemented by repeatedly scanning the various transmit/receive modules 41 for a time sufficient for this process to take place. Accordingly, if the scan counter has not exceeded the quantity M, then the program loops back to function 502 until that event occurs.

When the scan counter exceeds M, then function 509 sets the status to idle and function 510 is a waiting function which can be exited into a number of different states depending upon a subsequent event.

If at any time in proceeding through these functions, function 504 determines, that a particular transmit/receive module 41 has data to send, then the program skips to function 511.

At function 511 a decision is made depending upon the status, and in our example the status is still set at idle and therefore, function 512 is performed to send an inquiry character in an attempt to sieze the communication channel between the concentrator and the sink. Function 513 thereafter waits until a character is received. If a character is received, function 514 determines whether that is the acknowledgement character, indicating that the sink is ready to receive. If it is not the acknowledgement character, function 515 determines if this is the third inquiry that has been sent without a proper receipt. If it is not, functions 512 through 514 will be performed again. After three loops, the attempt at communication is aborted in a manner to be explained. Assuming, however, that on one or more of these loops function 514 detects the acknowledgement character then function 518 sets the status to send and initiates the timer, and function 519 sends the contents of the channel counter. It will be recalled that the channel counter had either been set or incremented to point to a channel with data to send, and therefore, function 519 corresponds to sending the identification of the channel from which the character was received, corresponding to the address of the terminal which transmitted the character. Function 520 determines whether or not a character has been received, at the transmitter/receiver module 43. When a character is received, function 521 compares it to the channel counter to determine if the address has been properly echoed. If it has, function 522 sends the data to the address of the channel counter, that is, the data from the transmit/receive module 41 pointed to by the channel counter is coupled to the transmit/receive module 43 for transmission to the sink. Function 523 detects whether or not a character has been received (at the transmit/receive module 43) in effect looking for the expected echo. When a character is received function 524 returns the received character to the address of the channel counter, that is, the character is coupled from the transmit/receive module 43 to the particular transmit/receive module 41 pointed to by the channel counter, and the character is sent to the terminal. Function 525 thereafter zeros the scan counter and the program loops back to function 505 where it continues to scan all the transmit receive modules 41. It may either find another transmit/receive module 41 with data to transmit, in which event this function is effected or it may return to the particular transmit/receive module 41 which initially initiated the transmission. In either event, when function 511 is thereafter performed the status will not be idle, and function 516 will determine that the status is send, and therefore, the program will jump directly to function 519 to send the contents of the channel counter.

Two points are significant about this processing, firstly, while the concentrator checks to see that the sink's address echo is proper (function 521) there is no corresponding check on the data character echo, that is, for example, function 524 merely ships the data echo back to the terminal without making any error check thereon.

If in the course of this precessing, function 521 determines that the echoed address did not match the channel counter then function 527 (FIG. 5B) is performed to send an SYN character to indicate to the sink that its address echo is improper. Function 528 awaits for an echo to the SYN character. When a character is received function 529 determines whether or not it matches the SYN character. If it does, function 526 is performed to determine whether or not this is the third RESTART with the same address. If it is not, then function 519 is performed to again attempt to transfer the address which caused entry into this portion of the program. If, at function 529 the SYN character was improperly echoed, then function 530 determines if this is the third improper echo, and if it is not functions 527 and following are performed in an attempt to transfer this particular address and associated data character. On the other hand, if at function 530 it is determined that this is the third improper echo, then functon 531 sends the ENQ character, in effect attempting to re-establish communication. If they are successful, in that function 532 detects a received character, function 532 determines if that is the ACK character, and the program loops to function 519 to again send the channel address. If the response to the ENQ at function 531 is not the ACK character, then transmission must be aborted. To that end function 534 detects the presence of an interrupt from transmit/receive module 43 indicating that the sink is attempting to transmit. If there is none, then function 535 provides a delaying function, and function 536 determines if the delay has timed out yet. In one embodiment of the invention functions 535 and 536 impose a two millisecond delay. When that delay is completed the program loops back to function 505 looking for additional data to send.

On the other hand, if at function 534 an interrupt from transmit/receive module is detected then the program loops to point F (FIG. 5B) to effect a receive function.

When the concentrator 40 has transmitted all the information presently available for transmission, and has thereafter scanned all the channels the given M number of times without detecting any further data to send, and at function 509 (FIG. 5A) it is determined that the concentrator is not in the idle status, but at function 540 it is determined that it is in the send status, this status must be terminated and both the concentrator and receiver placed in the idle status; the manner in which this is effected is now explained. Function 541 sends an EOT character, indicating the desire to terminate sender status at the concentrator. Function 542 awaits for an echo, and function 543 determines whether or not that echo is the OK character indicating that the sink has properly received the end of transmission character. If it is, function 549 sets the status of the concentrator to IDLE terminates the timer, and loops the function 510 (FIG. 5B) to await a further event requiring processing.

If the sink's echo was not the OK character, then function 534 determines if it was the NUL character (which my be transmitted if the receiver detects a parity, framing or overrun error in the EOT character). If it was, then function 550 is performed to determine whether or not this was the third attempt to send EOT. If it was not, then function 541 et seq. is then performed to attempt to properly terminate this particular communication session. On the other hand, if this was the third attempt to send the EOT character then the program jumps to function 534 (FIG. 5A) to in effect abort this function.

On the other hand, if at function 544 it was determined that the echo received from the sink was not the NUL character, then the concentrator and sink are in some ambiguous state, since the concentrator cannot verify the last character received at the sink, and therefore does not know whether or not the sink is in receiver or idle status. Accordingly, function 545 again sends the ENQ character. Regardless of the sink's status, it should transmit the ACK character and place itself in receiver status. Function 551 awaits for an echo, and function 546 determines when that echo is received whether it is the ACK character. If it is, then the concentrator has determined that the sink is still in receiver status and a further attempt may be made, depending on the outcome of function 550, to alter that status. On the other hand, if the echo received from the sink was not the ACK character then function 547 determines if it was the ENQ character, indicating that the sink is attempting to seize the communication link. If it is, function 552 sends the ACK character indicating, to the sink, the concentrator's giving up of the communication link, function 548 sets the receiver status at the concentrator and the program jumps to point D (FIG. 5B). If, at function 547 the ENQ character is not recognized, then function 545 is again performed in an attempt to terminate the communication.

If, at functions 509,540 the concentrator was determined to be neither in idle nor send then the program skips, via H, to the wait loop (FIG. 5B).

If the concentrator, after scanning the channels M times finds no data to send, or if for any other reason it is placed in a wait status (function 510) then functions 560 and functions 553 are continually performed in the course of the wait function to determine whether a character has been received at one of the transmit/receive modules 41 or at the transmit/receive module 43; the former indicating the transmit function is required, and the latter indicating a reception function is required.

Assuming that it is determined that transmit/receive module 43 has received a character, then function 554 sets a receive timer, function 555 determines if the character received was the ENQ character. If it was, it indicates that the sink was attempting to acquire the communication link. Function 557 sends the ACK character, to indicate to the sink it can have control of the communication link and function 558 sets the concentrator status to receive. On the other hand, if in attempting to terminate communication the concentrator determines at function 547 (FIG. 5A) that the sink is attempting to acquire the link, then the program jumps through point D to perform function 559, which is similar to function 554 and that initiates the receive timer. In either event, function 561 then checks to see if a character is received, and if it has not been received, then function 563 checks the timer. At any time that the timer expires the concentrator goes into a wait status, after resetting the status to idle (function 570).

On the other hand if function 555 determines that the received character is not ENQ then function 556 echoes the character and then the program returns to the wait loop. This is an indeterminate state which may continue until the timer expires, if the communication is not earlier terminated.

If the received character is an address character then function 564 echoes the address character and function 568 sets the channel counter equal to the received address. Thereafter, functions 569 and 580 wait for either another received character or expiration of the timer. When the next character is received, function 571 checks to see if it is the SYN character indicating that the concentrator's address echo was in error. If it is, then function 572 echoes the SYN character and the program loops back to function 561 to await an additional character.

On the other hand, if the received character at function 569 is not the SYN character then function 581 transfers the character from the transmit/receive module 43 to the transmitter/receive module 41 addressed by the channel counter. The addressed transmit/receive module then transmits this character to the terminal. Functions 582/583 await receipt of the character at the addressed transmit/receive module 41, or expiration of the timer. If a character is received, then function 584 transfers the character to the transmit/receive module 43, which transmits it to the sink. The program returns to function 561 to await reception of an additional character.

If at any time at function 561 a received character is detected to be the EOT character, at function 573, this indicates the sink's desire to terminate the communication session. Accordingly, function 574 sends the OK character the program jumps to point J to reset the concentrator at status idle, terminate the timer and await further events.

Accordingly, the electrical functions performed by the concentrator hardware are quite conventional. That is, when CPU 42 detects receipt of a character at one of modules 41 it will transfer that character to module 43, and vice versa. The control and protocol imposed on this transfer is explained in FIGS. 5A–5B.

From the foregoing description it will be seen that the concentrator's function in terms of error detection and correction is limited to verifying address information, and information originating at a terminal is verified at that point. In addition, the communication protocol is self-pacing in that during the transmission of a character, from terminal to sink or vice versa, the reception of that character must either be verified, and if it is not, error control procedures are initiated before the next character is handled. Notwithstanding this handling, it should also be seen that the concentrator is capable of interleaving transmission of a character from one terminal and transmission of a second character from the same terminal, with the transmission of characters from another terminal.

What is claimed is:

1. An information reporting system comprising:
a plurality of information accepting terminals,
a concentrator,
a plurality of duplex communication links, each connected between a different one of said terminals and said concentrator,
a common information sink comprising a digital signal processor and a further duplex communication link connecting said concentrator and said sink,
each of said terminals including:
transmitting/receiving means coupled to one of said duplex communication links for transmitting, when stimulated, information accepted by said terminal in the form of plural multi-bit words and for, at other times, receiving a multi-bit word, control means to stimulate said transmitting means to transmit a single word and then to transmit a single additional word, upon receipt, at said terminal, of an echo of said single transmitted word, until all words are transmitted,
said concentrator including a first transmitting and receiving means for each said terminal each coupled to a different one of said plurality of duplex communication links and a second transmitting and receiving means for said sink coupled to said further duplex communication link, and control means for selectively coupling information from one of said first transmitting and receiving means to said second transmitting and receiving means and for selectively coupling information from said second transmitting and receiving means to a selected one of said first transmitting and receiving means,
said common information sink including transmitting a receiving means and control means responsive to receipt of information from said further duplex communication link to transmit an echo of said information to said further duplex communication link.

2. The apparatus of claim 1 wherein each said first transmitting and receiving means at said concentrator includes,
means to store a word received from an associated terminal,
and said concentrator control means includes
means responsive to receipt of a word for simulating said second transmitting means to transmit a line request,
means responsive to an affirmative response from said second receiving means to stimulate said second transmitting means to transmit an address word identifying a terminal from which a word was received, and
means responsive to receipt of a proper echo of said address word by said second receiving means to stimulate said seciond transmitting means to transmit said stored word.

3. The apparatus of claims 1 or 2 wherein said concentrator control means includes:
means responsive to receipt, by said second receiving means, of said echo transmitted by said common information sink to stimulate one of said first transmitting means to transmit a copy of said echo on said selected one of said duplex communication links.

4. The apparatus of claim 1 in which at least one of said terminals includes printing means and wherein said control means includes means to stimulate said printing means to print a copy of transmitted information in one of two distinct forms indicating proper receipt of said information by said sink.

5. The apparatus of claim 2 wherein said concentrator control means includes
means to sequentially examine each of said first transmitting and receiving means to detect one with information to send and to sequentially advance counter means as each different first transmitting and receiving means is examined,
said means responsive to an affirmative response including means to derive said address word from said counter means.

6. The apparatus of claim 3 wherein said concentrator control means continues to sequentially examine different ones of said transmitting and receiving means for a minimum time period.

7. A communication system including a plurality of information generating terminals and at least one information accepting sink, all connected to a concentrator, said concentrator comprising:
a plurality of first transmit/receive means, one for each of said connected terminals,
a second transmit/receive means for said information sink,
concentrator control means including
first means responsive to receipt of a message information unit at a one of said first transmit/receive means to stimulate said second transmit/receive means to transmit an address designating said one of said first transmit/receive means,
second means responsive to receipt by said second transmit/receive means of an information unit to compare said received information unit with said address,
third means responsive to an equal comparison result for stimulating said second transmit/receive means to transmit said received message information unit,
fourth means responsive to subsequent receipt, by said second transmit-receive means of an information unit to unconditionally stimulate said one of said first transmit/receive means to transmit said received information unit.

8. The system of claim 7 in which at least one of said information generating terminals include:
- a terminal transmit/receive means coupled to one of said plurality of transmit/receive means at said concentrator,
- information source means generating a multi-word message, each word of multi-bit length, and
- control means responsive to the presence of a message at said information source means for stimulating said terminal transmit/receive means to transmit a single multi-bit word of said message,
- said control means including means to stimulate said terminal transmit/receive means to transmit a further word of said message only when said terminal transmit/receive means receives a correct copy of a prior transmitted word.

9. The apparatus of claim 7 in which said
- control means includes a timer and means to set said timer each time transmission of a message is initiated,
- means responsive to expiration of said timer prior to completion of transmission of said message for thereafter terminating transmission of said message.

10. A communication protocol for transferring information from a plurality of terminal units, through a concentrator, to an information sink comprising the steps of:
- (a) transmitting, from a terminal unit, a first information unit of a multi-unit record at any time such record is available,
- (b) upon receipt, at said concentrator of an apparent information unit, transmitting to said sink a request to achieve sender status but only if both concentrator and sink are idle, queuing said request if said concentrator is in receiver status and skipping this step if said concentrator is in sender status,
- (c) upon receipt, at said sink of a request to achieve sender status, transmitting an acknowledgement to said concentrator,
- (d) upon receipt, at said concentrator of an acknowledgement from said sink signifying sender status, transmitting an address corresponding to said terminal unit,
- (e) upon receipt, at said sink of an apparent address following transmission of an acknowledgement by said sink, transmitting a copy of said apparent address,
- (f) upon subsequent proper receipt, at said concentrator of said address, transmitting said apparent information unit,
- (g) upon receipt, at said sink of said apparent information unit, transmitting a copy of said apparent information unit,
- (h) upon subsequent receipt, at said concentrator of an apparent copy of an information unit, transmitting to said terminal said apparent copy of said information unit,
- (i) upon receipt of said terminal unit of an echo of said first information unit subsequent to transmission thereof transmitting a subsequent information unit.

11. The method of claim 10 wherein the step (i) includes the step of comparing said echo received from said concentrator with said first information unit and transmitting said second information unit only if said echo and said first information unit are identical.

12. The method of claims 10 or 11 which includes a step (j) of transmitting a first control character if said echo of step (i) is not identical to said first information unit.

13. The method of claim 12 which includes the further step of retransmitting at said terminal said first information unit only if an echo of said first control character is received.

14. The method of claim 10 which includes the further steps of transmitting, from said concentrator (1) said address and (2) each subsequent information unit for each subsequent information unit received at said concentrator, and the final steps of transmitting a second control character when no further information units remain to be transmitted and, upon receipt of an acknowledgement of said second control character, achieving idle status.

* * * * *